United States Patent
Wang

(10) Patent No.: US 9,831,658 B2
(45) Date of Patent: Nov. 28, 2017

(54) SIDE-EJECTION SURGE ABSORBER MODULE

(71) Applicant: SUZHOU CERAMATE TECHNICAL CO., LTD., Suzhou (CN)

(72) Inventor: Hui-Ping Wang, Suzhou (CN)

(73) Assignee: SUZHOU CERAMATE TECHNICAL CO., LTD., Suzhou (CN)

( * ) Notice: Subject to any disclaimer, the term of this patent is extended or adjusted under 35 U.S.C. 154(b) by 33 days.

(21) Appl. No.: 14/928,589

(22) Filed: Oct. 30, 2015

(65) Prior Publication Data

US 2017/0125997 A1    May 4, 2017

(51) Int. Cl.
*H02H 3/22* (2006.01)
*H01H 85/04* (2006.01)
*H01H 85/20* (2006.01)

(52) U.S. Cl.
CPC .............. *H02H 3/22* (2013.01); *H01H 85/04* (2013.01); *H01H 85/20* (2013.01)

(58) Field of Classification Search
CPC ...... H01H 61/02; H01H 61/04; H01H 71/164; H01H 85/0047; H01H 85/0052; H01H 85/0056; H01H 85/0026; H01H 85/25; H01H 9/22; H01H 9/045; H01H 9/104; H01H 71/126; H01H 2037/762; H01H 2085/0486
USPC ................................. 337/166, 186, 207, 98, 5
See application file for complete search history.

(56) References Cited

U.S. PATENT DOCUMENTS

| | | | | |
|---|---|---|---|---|
| 2006/0245125 A1* | 11/2006 | Aszmus | ............... | H01C 7/126 361/56 |
| 2008/0043395 A1* | 2/2008 | Donati | ............... | H01C 7/126 361/118 |
| 2010/0290168 A1* | 11/2010 | Wang | ............... | H01T 1/14 361/104 |
| 2010/0328016 A1* | 12/2010 | Wang | ............... | H01C 7/126 337/158 |
| 2011/0248816 A1* | 10/2011 | Duval | ............... | H01C 7/126 338/20 |
| 2012/0014028 A1* | 1/2012 | Daum | ............... | H01C 7/12 361/118 |
| 2012/0068806 A1* | 3/2012 | Guarniere | ............... | H01C 7/10 337/1 |
| 2015/0171622 A1* | 6/2015 | Lee | ............... | H01C 7/126 361/93.7 |
| 2016/0111871 A1* | 4/2016 | Ruess | ............... | H02H 5/04 361/118 |
| 2016/0204723 A1* | 7/2016 | Brady | ............... | H02P 9/00 322/28 |

* cited by examiner

*Primary Examiner* — Jerry Wu
*Assistant Examiner* — Stephen Sul
(74) *Attorney, Agent, or Firm* — Chun-Ming Shih; HDLS IPR Services

(57) ABSTRACT

A surge absorber module includes a conductive bracket with an end fixed to a main body and electrically connected to a pin, and the other end electrically connected to a surge absorbing member through a hot melt member, and an elastic member with an end elastically abutting the main body and the other end elastically abutting the conductive bracket. The conductive bracket is elastically abutted by the elastic member to move horizontally in an accommodating space and disconnect the electrically connected surge absorbing member.

14 Claims, 6 Drawing Sheets

SIDE-EJECTION SURGE ABSORBER MODULE

TECHNICAL FIELD

The technical field relates to a surge absorber module, more particularly to the surge absorber module having a conductive bracket that is separable sideway for an open circuit.

BACKGROUND

In general, a surge absorber for protecting load devices and/or other electronic components is connected with a circuit in series to prevent surges including pulsed voltage or pulsed current.

In a conventional surge absorber, a hot melt member is used to solder and fix an end of a metal bracket to a surface of an electrode (that is connected to a power supply), and then the other end of the metal bracket is connected to a circuit load. When a surge occurs, the surge will enter into an absorber body and generate heat. Now, the hot melt member soldered onto the surface of the electrode is heated and melted, so that the metal bracket will be separated and ejected from the predetermined position, and the path of the power input will be situated in an open circuit status, so as to achieve the effect of protecting circuit loads or equipments.

In the use of present electronic products, if a surge such as an overvoltage or a lightning strike is transmitted to an electrical product, certain electronic components installed in the electrical product may be damaged. Therefore, the surge absorber is often applied in electronic products. Since the surge absorber occupies much space, it is a main subject of this disclosure to reduce the circuit of the surge absorber and apply such surge absorber in the electronic products with a light, thin, short and compact design.

In view of the aforementioned issue, the discloser of this disclosure based on years of experience in the industry to conduct extensive researches and experiments and finally provided a feasible solution to overcome the problem of the prior art effectively.

SUMMARY

It is a primary objective of this disclosure to provide a side-ejection surge absorber module that comes with a small thickness to reduce the circuit and achieve the effect of protecting circuit loads or equipments.

Another objective of this disclosure is to provide a side-ejection surge absorber module that includes a conductive bracket elastically abutted by an elastic member, so that the connected surge absorbing member may be disconnected quickly to achieve an open circuit.

To achieve the aforementioned and other objectives, this disclosure provides a side-ejection surge absorber module, comprising: a main body, a plurality of pins, at least one surge absorbing member, a conductive bracket and an elastic member. The main body has an accommodating space; the plurality of pins is installed onto the main body; the surge absorbing member is installed in the accommodating space and electrically coupled to the pin; the conductive bracket is installed at an edge of the surge absorbing member and has an end fixed to the main body and electrically coupled to the pin and the other end electrically coupled to the surge absorbing member through a hot melt member; and the elastic member is installed on the main body and has an end elastically abutting the main body and the other end elastically abutting the conductive bracket. After being melted by the hot melt member, the conductive bracket is abutted by the elastic force of the elastic member to move horizontally sideway in the accommodating space to disconnect the electrically connected surge absorbing member.

A further objective of this disclosure is to provide a side-ejection surge absorber module further comprising a low voltage protection member and an insulating base, wherein the insulating base is provided for isolating the surge absorbing member and the low voltage protection member to achieve the effect of protecting high-voltage and low-voltage loads.

Compared with the conventional surge absorber module, the conductive bracket is ejected longitudinally after the surge enters into the main body, and the conductive bracket of the side-ejection surge absorber module of this disclosure is moved horizontally sideway in the accommodating space, so that the height of the main body can be reduced to provide a thin surge absorber module. In addition, the conductive bracket of this disclosure is elastically abutted by the elastic member (or torque spring) to disconnect the surge absorbing member to form an open circuit in order to protect the circuit load or equipment, and improve the practicality of this disclosure.

DESCRIPTION OF THE PREFERRED EMBODIMENTS

Figure 1:
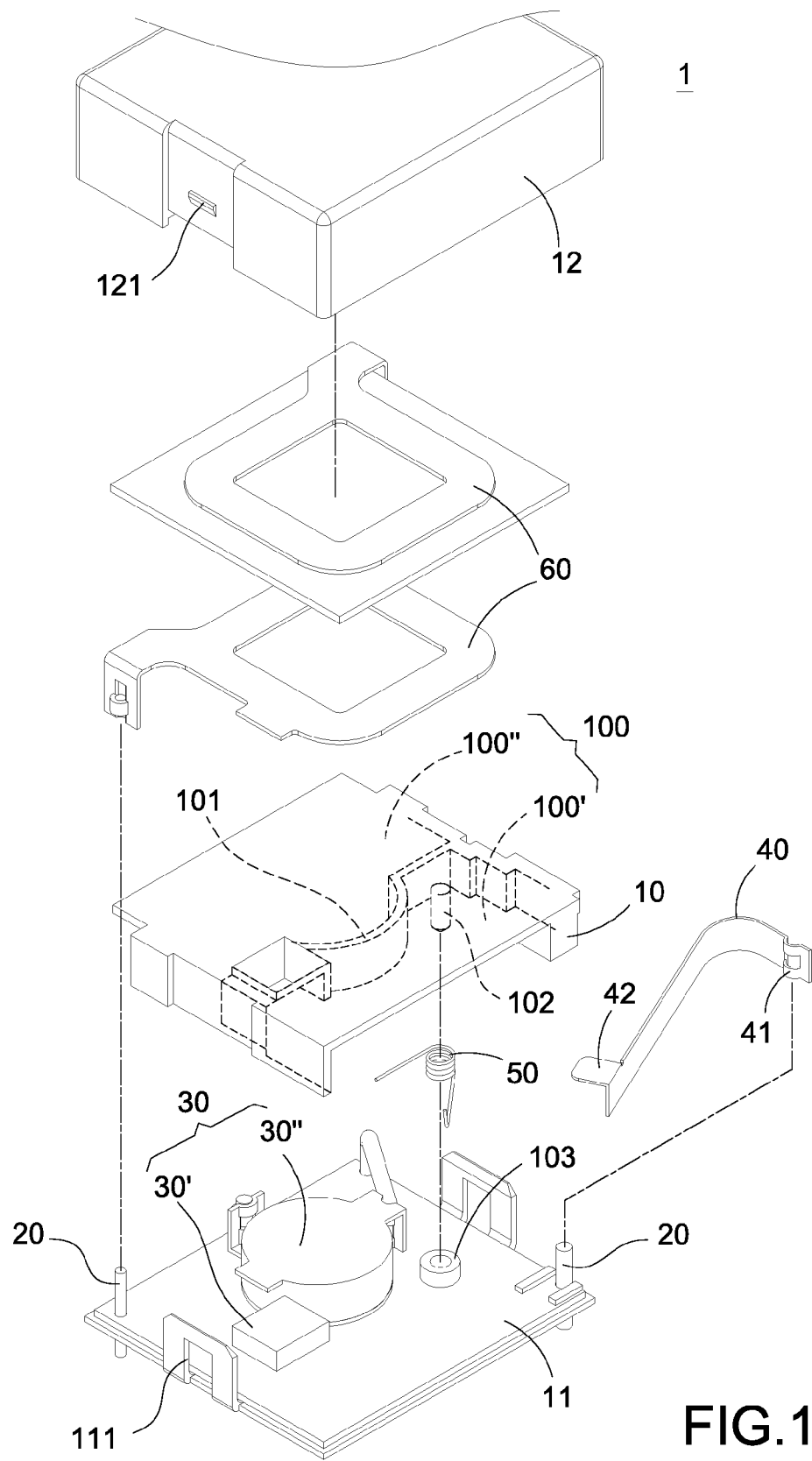
FIG. 1 is an exploded view of a side-ejection surge absorber module of this disclosure.

The technical contents of this disclosure will become apparent with the detailed description of preferred embodiments accompanied with the illustration of related drawings as follows. It is intended that the embodiments and figures disclosed herein are to be considered illustrative rather than restrictive.

With reference to FIGS. 1 to 4 for an exploded view, a perspective view and cross-sectional views (viewing from both sides) of a side-ejection surge absorber module of this disclosure respectively, the side-ejection surge absorber module 1 comprises a main body 10, a plurality of pins 20, at least one surge absorbing member 30, a conductive bracket 40 and an elastic member 50.

The pins 20, the surge absorbing member 30 and the conductive bracket 40 are installed in the main body 10 and electrically coupled to one another, and the conductive bracket 40 is detachable quickly from the electrical connection of the surge absorbing member 30 through the elastic member 50.

Figure 2:
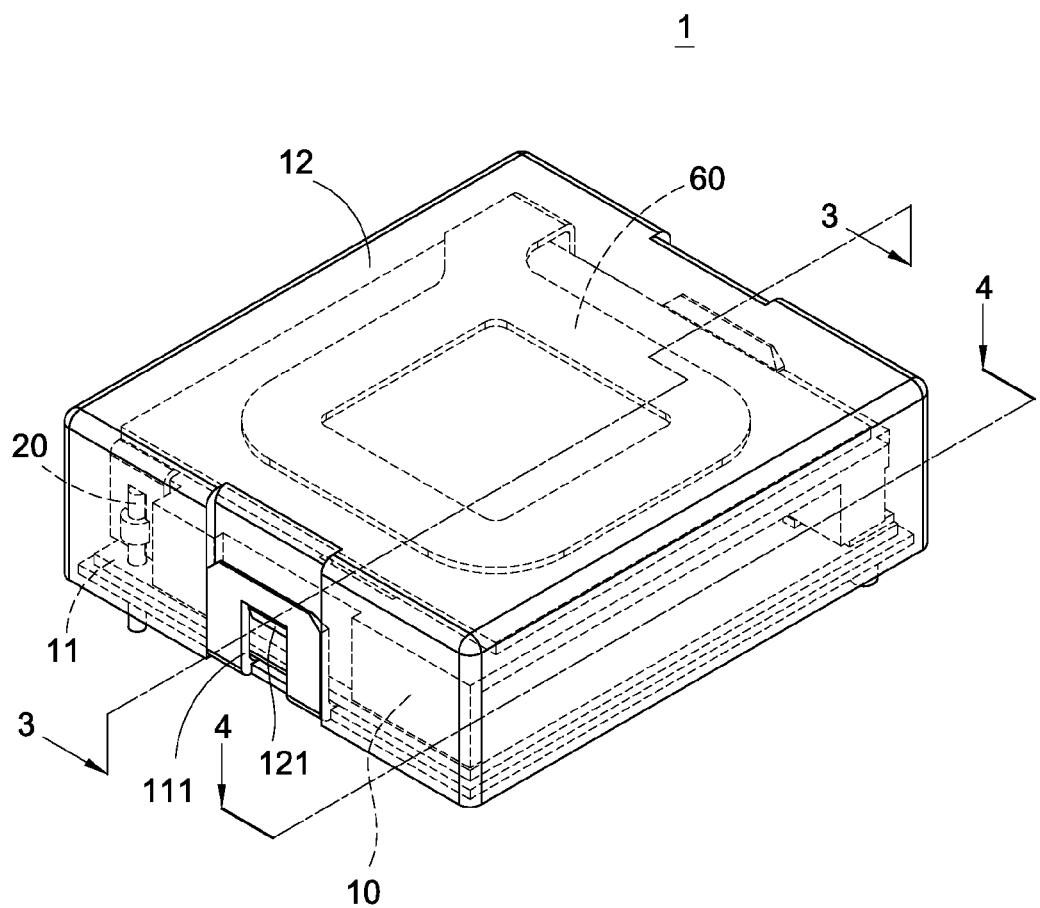
FIG. 2 is a perspective view of a side-ejection surge absorber module of this disclosure.
Figure 3:
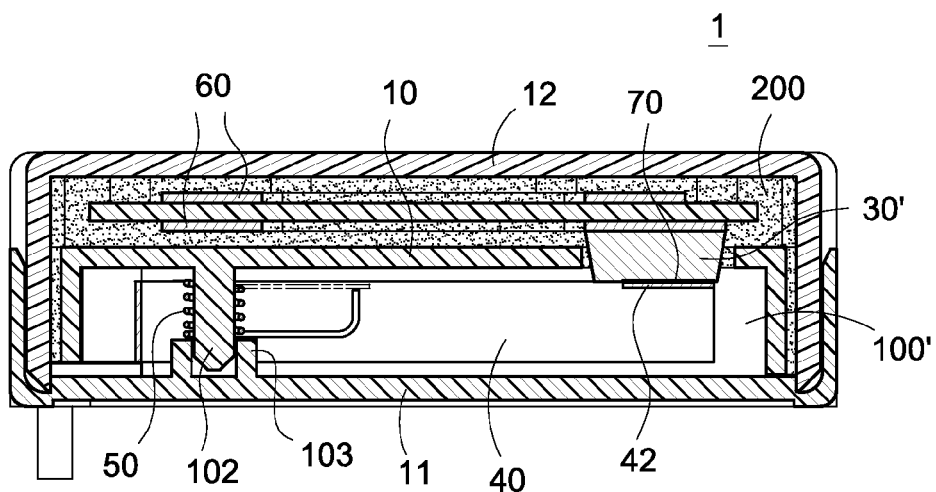
FIG. 3 is a cross-sectional view of Section 3-3 as depicted in FIG. 2.

The main body 10 has an accommodating space 100. Preferably, the main body 10 is made of an insulating plastic material material. In addition, the surge absorber module 1 further comprises a cover plate 11 and a base 12. The cover plate 11 and the base 12 are covered onto both sides of the main body 10 respectively and sealed onto the accommodating space 100. In addition, both sides of the cover plate 11 have a plurality of latch slots 111, and both sides of the base 12 have a plurality of corresponsive hooks 121. In FIG. 2, the cover plate 11 is combined with the base 12 through the connection with the latch slot 111 of the cover plate 11 and the latch slot 121 of the base 12.

The pins 20 are installed to the main body 10 for connecting an external power supply to provide the required electric power for the operation of the surge absorbing member 30. In a preferred embodiment of this disclosure, the surge absorber module 1 further comprises a plurality of electrodes 60 installed between the main body 10 and the base 12 and respectively and electrically coupled to the pins 20. In this preferred embodiment, an insulating plastic material 200 such as epoxy resin is filled between the main body 10 and the base 12, and the insulating plastic material 200 covers the pins 20 and isolates the electrodes 60 to provide an insulating effect.

The surge absorbing member 30 (also known as varistor) is a passive components for protecting a circuit. The surge absorbing member 30 changes the resistance value with the voltage value of an electronic component. Preferably, the surge absorbing member 30 is a surge absorber (or varistor) or a gas discharge tube. The surge absorbing member 30 is installed in the accommodating space 100 and electrically coupled to the pins 20. In this preferred embodiment, there are multiple surge absorbing members 30, and the surge absorbing members 30 include a surge absorber 30' and a gas discharge tube 30". In addition, the main body 10 has a partition plate 101 that divides the accommodating space 100 into two independent accommodating spaces 100', 100", and the surge absorbing members 30 are disposed in the two independent accommodating spaces 100', 100" respectively to achieve the insulating effect.

Figure 4:
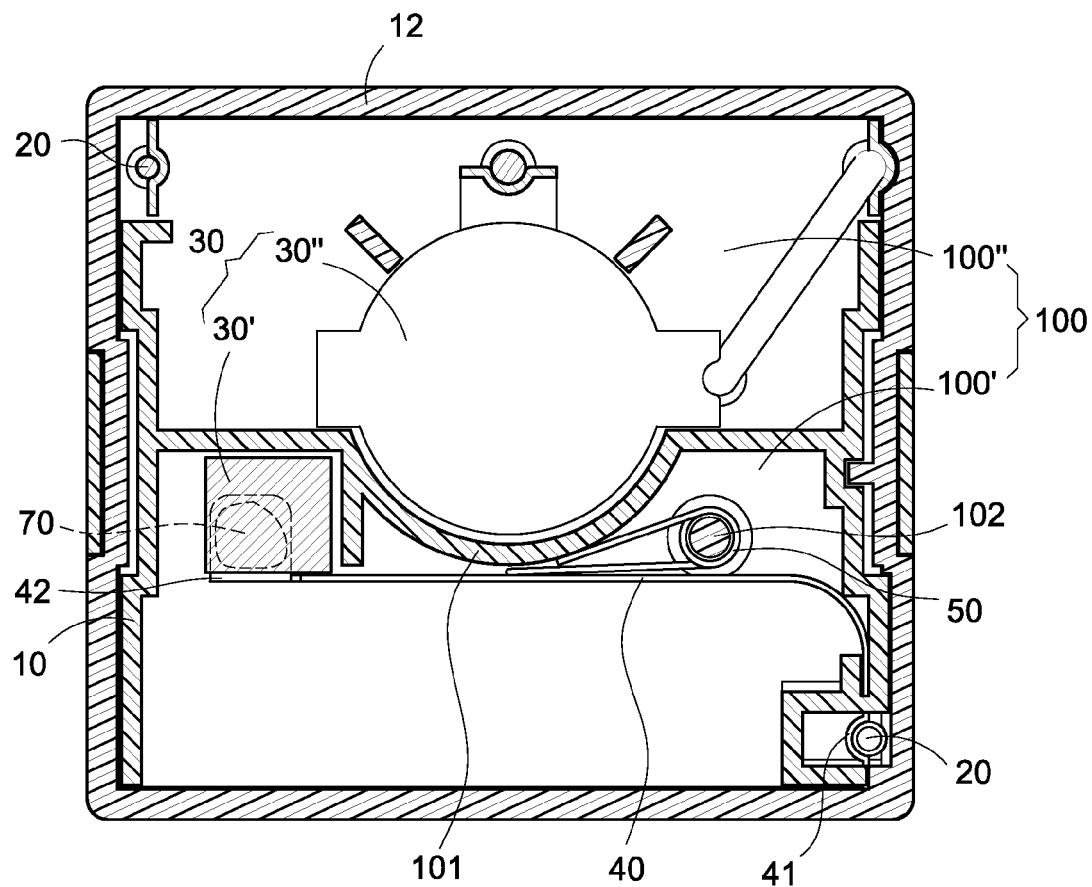
FIG. 4 is a cross-sectional view of Section 4-4 as depicted in FIG. 2.

The conductive bracket 40 is a bracket made of a conductive metal. The conductive bracket 40 is installed at an edge of the surge absorbing member 30 and has an end fixed to the main body 10 and electrically coupled to the pin 20 and the other end electrically coupled the surge absorbing member 30 to through a hot melt member 70 (as shown in FIG. 4). In this preferred embodiment, the hot melt member 70 is a solder, and an end of the conductive bracket 40 is soldered and fixed to the surge absorbing member 30. In addition, the conductive bracket 40 is substantially L-shaped, and a positioning arc plate 41 is formed at an end of the conductive bracket 40 and a tab 42 is formed at the other end of the conductive bracket. The positioning arc plate 41 is coupled to the pin 20, and the tab 42 is coupled to the hot melt member 70.

The elastic member 50 is preferably a torque spring, but this disclosure is not limited to the torque spring only. The elastic member 50 is installed onto the main body 10, and an end of the elastic member 50 elastically abuts the main body 10 and the other end of the elastic member 50 elastically abuts the conductive bracket 40. In this preferred embodiment, the main body 10 has a positioning pillar 102, and the cover plate 11 has a corresponsive positioning ring 103 disposed on a side facing the main body 10, wherein the positioning pillar 102 has the elastic member 50 sheathed thereon, and an end of the positioning pillar 102 is positioned onto the positioning ring 103.

If an external voltage entering into the surge absorber module 1 exceeds a rated voltage, the resistance of the surge absorbing member 30 drops drastically to a substantially short-circuit status, and the surge is guided to enter into surge absorbing member 30 and converted into heat which is dissipated, so as to achieve the effects of absorbing the surge and stabilizing the voltage and prevent circuits and components from being damaged by the surge voltage.

Figure 5:
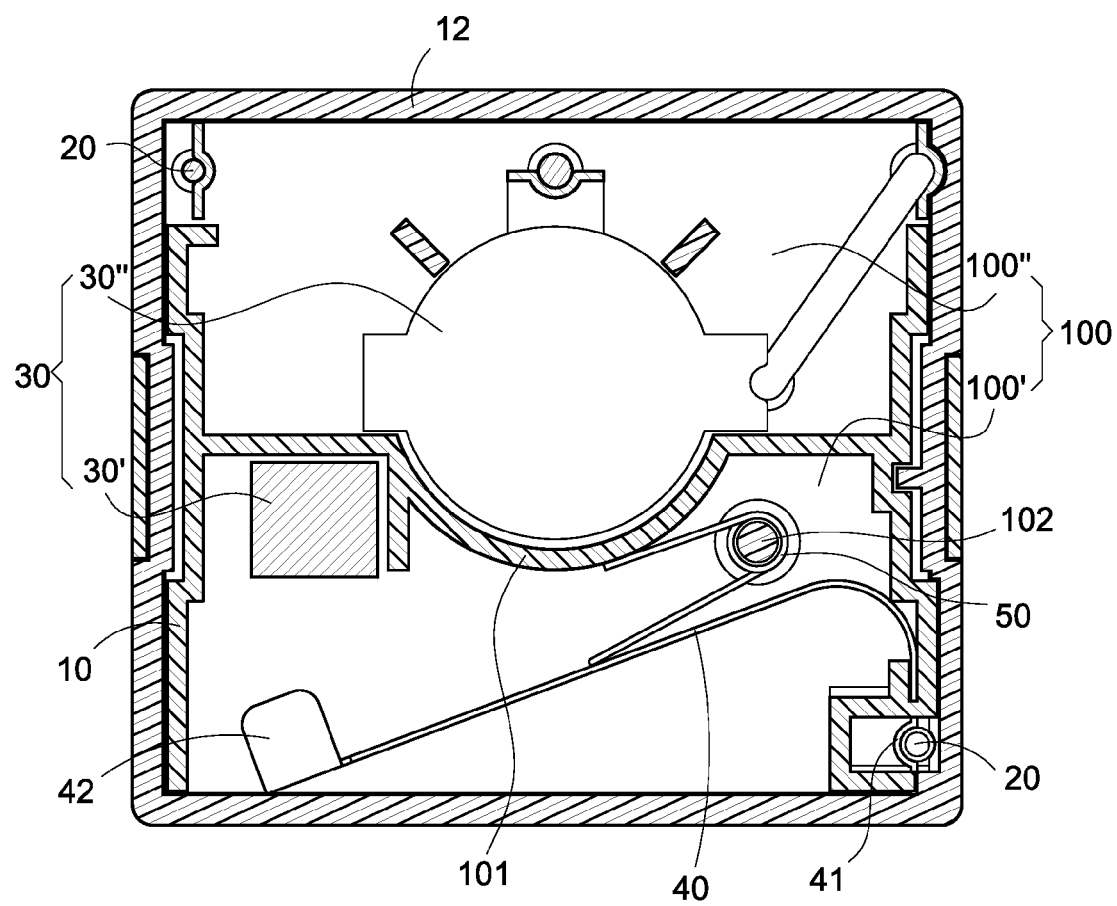
FIG. 5 is a schematic view of ejecting a conductive bracket of a side-ejection surge absorber module of this disclosure.

With reference to FIG. 5 for a schematic view of ejecting a conductive bracket of a side-ejection surge absorber module of this disclosure, if the surge is guided to enter into surge absorbing member 30, the surge is converted into heat to melt the hot melt member 7. After the hot melt member 70 is melted, the conductive bracket 40 is elastically abutted by the elastic force of the elastic member 50 to move horizontally sideway in the accommodating space 100 to disconnect the surge absorbing member 30 quickly to form an open circuit, so as to achieve the effect of protecting a circuit load or equipment.

Figure 6:
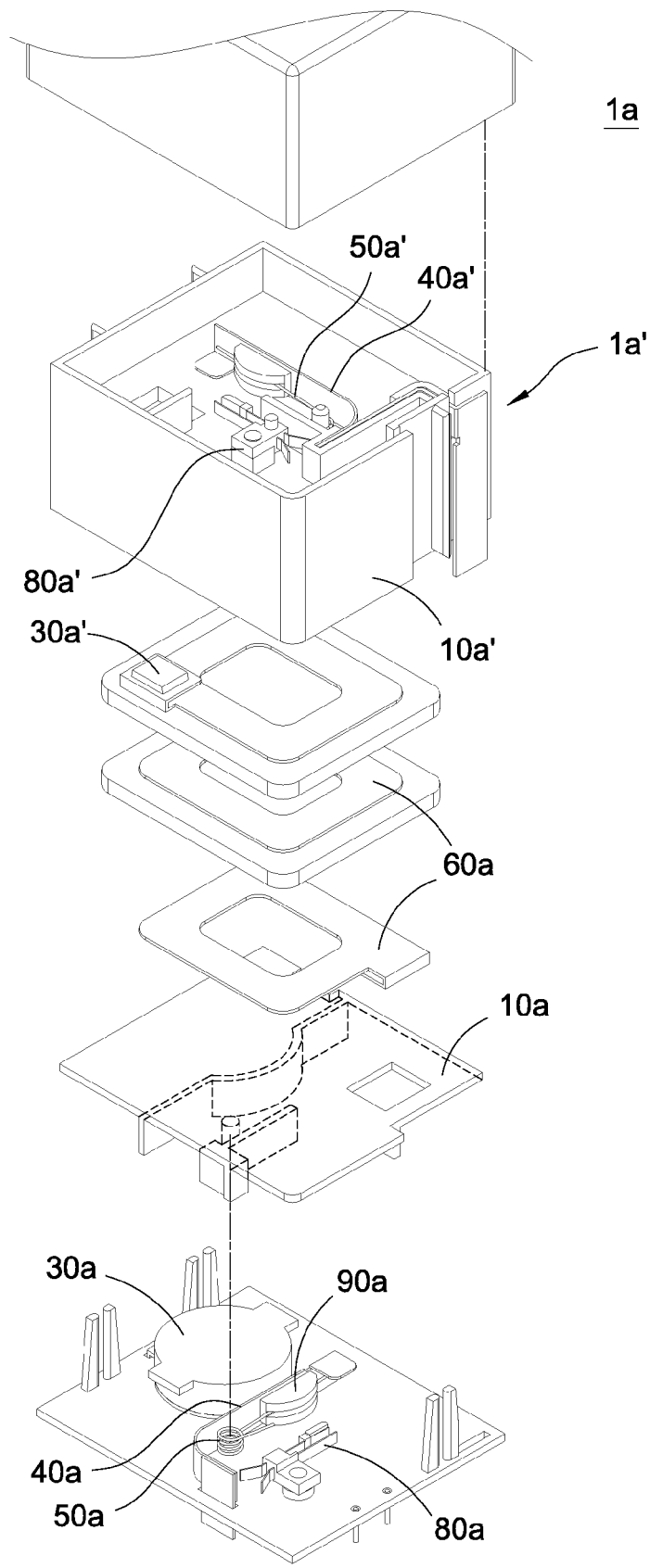
FIG. 6 is an exploded view of a side-ejection surge absorber module in accordance with another preferred embodiment of this disclosure.
Figure 7:
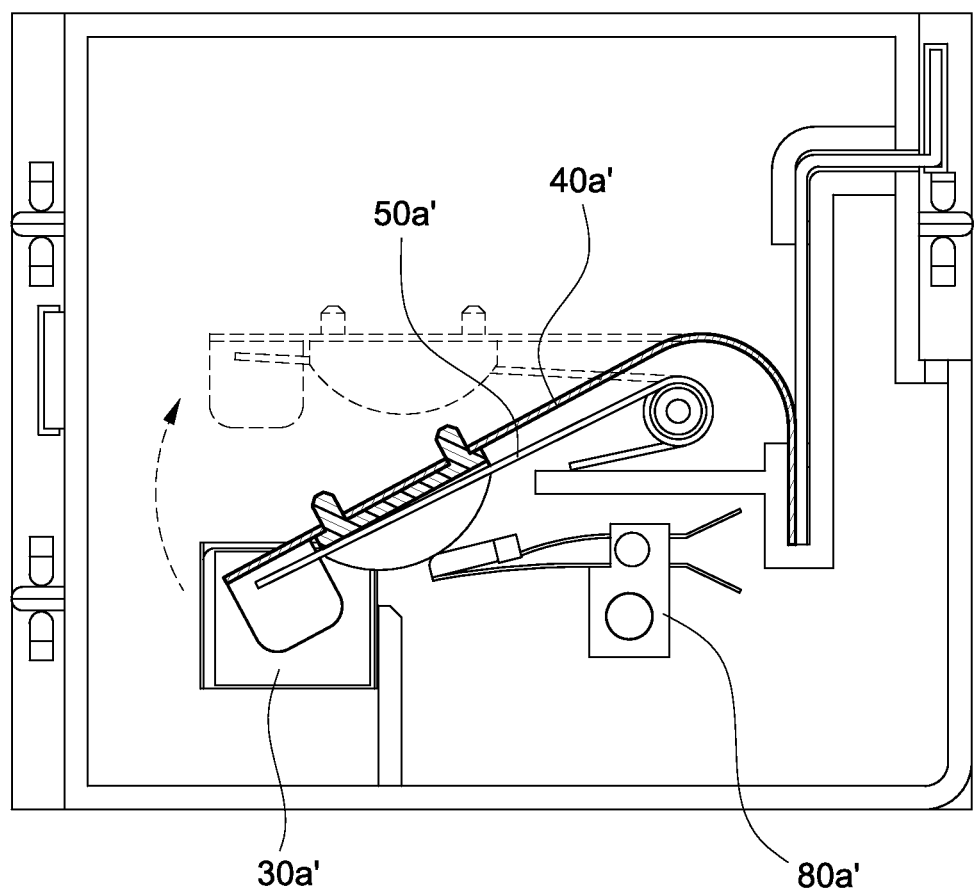
FIG. 7 is a schematic view of using a side-ejection surge absorber module in accordance with another preferred embodiment of this disclosure.

With reference to FIGS. 6 and 7 for an exploded view and a schematic view of a side-ejection surge absorber module in accordance with another preferred embodiment of this disclosure, the surge absorber module 1a comprises a main body 10a, a surge absorbing member 30a, a conductive bracket 40a and an elastic member 50a. The difference between this preferred embodiment and the previous preferred embodiment resides on that the surge absorber module 1a of this preferred embodiment further comprises a low voltage protection member 80a electrically coupled to the surge absorbing member 30a and an insulating base 90a coupled to the conductive bracket 40a and the elastic member 50a. The insulating base 90a and the conductive bracket 40a are provided for isolating the surge absorbing member 30a and the low voltage protection member 80a to achieve the effect of protecting both high-voltage and low-voltage loads.

It is noteworthy that the surge absorber module 1a of this preferred embodiment further comprises a second surge absorber module 1a'. The second surge absorber module 1' comprises a second main body 10a', a second surge absorbing member 30a' installed in the second main body 10a', a second conductive bracket 40a' electrically coupled to the second surge absorbing member 30a', and a second elastic member 50a' elastically coupled to the second conductive bracket 40a'. In addition, the second conductive bracket 40a' is abutted by the elastic force of the second elastic member 50a' to move horizontally sideway to disconnect the second surge absorbing member 30a'.

In this preferred embodiment, the second surge absorber module 1a' further comprises a second low voltage protection member 80a' electrically coupled to the second surge absorbing member 30a'. In FIG. 7, when the surge is guided to enter into the second surge absorber module 1a', the second surge absorbing member 30a' converts the surge into heat to melt the hot melt member. Now, the second conductive bracket 40a' is moved horizontally sideway to disconnect the second surge absorbing member 30a' and the second low voltage protection member 80a' to form an open circuit, so as to achieve the effect of protecting a circuit load or equipment.

While this disclosure has been described by means of specific embodiments, numerous modifications and variations could be made thereto by those skilled in the art without departing from the scope and spirit of this disclosure set forth in the claims.

What is claimed is:

1. A side-ejection surge absorber module, comprising:
a main body, having an accommodating space; a plurality of pins, disposed on the main body; at least one surge absorbing member, installed in the accommodating space, and electrically coupled to the pins;
a cover plate and a base, and the cover plate and the base covering both sides of the main body and sealing the accommodating space;
a conductive bracket, installed at an edge of the surge absorbing member, and having an end fixed to the main body and electrically coupled to one of the pins and the other end electrically coupled to the surge absorbing member through a hot melt member; and
an elastic member, installed on the main body, and having an end elastically abutting the main body and the other end elastically abutting the conductive bracket; thereby, after being melted by the hot melt member, the conductive bracket is abutted by the elastic force of the elastic member to move horizontally sideway in the accommodating space and disconnect the electrically coupled surge absorbing member,
wherein the main body has a positioning pillar, and the cover plate has a corresponsive positioning ring disposed on a side facing the main body, and the positioning pillar has the elastic member sheathed thereon, and an end of the positioning pillar is positioned onto the positioning ring.

2. The side-ejection surge absorber module according to claim 1, further comprising a plurality of electrodes installed between the main body and the base respectively, and electrically coupled to the pins.

3. The side-ejection surge absorber module according to claim 2, further comprising an insulating plastic material filled between the main body and the base and covered onto the pins for insolating the electrodes.

4. The side-ejection surge absorber module according to claim 1, further comprising a plurality of hooks formed on both sides of the base, and a plurality of corresponsive latch slots formed on both sides of the cover plate, and the cover plate being combined with the base through the connection of the hooks with the latch slots.

5. The side-ejection surge absorber module according to claim 1, wherein the surge absorbing member comes with plural quantity, and the main body has a partition plate for dividing the accommodating space into two independent accommodating spaces, and the surge absorbing members are disposed in the two independent accommodating spaces respectively.

6. The side-ejection surge absorber module according to claim 5, wherein the surge absorbing members include a surge absorber and a gas discharge tube.

7. The side-ejection surge absorber module according to claim 1, wherein the surge absorbing member is a surge absorber or a gas discharge tube.

8. The side-ejection surge absorber module according to claim 1, wherein the conductive bracket is substantially L-shaped, and a positioning arc plate is formed at an end of the conductive bracket, and a tab is formed at the other end of the conductive bracket, and the positioning arc plate is coupled to one of the pins, and the tab is coupled to the hot melt member.

9. The side-ejection surge absorber module according to claim 1, wherein the elastic member is a torque spring.

10. The side-ejection surge absorber module according to claim 1, further comprising a low voltage protection member electrically coupled to the surge absorbing member, such that after the hot melt member is melted, the conductive bracket is moved horizontally sideway to disconnect the surge absorbing member and the low voltage protection member.

11. The side-ejection surge absorber module according to claim 10, further comprising an insulating base coupled to the conductive bracket and the elastic member, and the insulating base and the conductive bracket being provided for isolating the surge absorbing member and the low voltage protection member.

12. The side-ejection surge absorber module according to claim 1, further comprising a second surge absorber module, and the second surge absorber module including a second main body and a second surge absorbing member installed in the second main body, and a second conductive bracket being electrically coupled to the second surge absorbing member and a second elastic member being elastically coupled to the second conductive bracket, and the second conductive bracket being abutted by the elastic force of the second elastic member to move horizontally sideway to disconnect the electrically coupled second surge absorbing member.

13. The side-ejection surge absorber module according to claim 12, further comprising a second low voltage protection member electrically coupled to the second surge absorbing member, and the second conductive bracket being moved horizontally sideway to disconnect the second surge absorbing member and the second low voltage protection member.

14. The side-ejection surge absorber module according to claim 13, further comprising a second insulating base coupled to the second conductive bracket and the second elastic member, and the second insulating base and the second conductive bracket being provided for isolating the second surge absorbing member and the second low voltage protection member.

* * * * *